(12) United States Patent
Shin et al.

(10) Patent No.: US 6,393,009 B1
(45) Date of Patent: May 21, 2002

(54) METHOD FOR MANAGING TRUNK STATUS OF A CDMA MOBILE COMMUNICATION EXCHANGE

(75) Inventors: Yeon Seung Shin, Daejeon; Jung Mo Moon, Seoul; Dae Sik Kim, Daejeon, all of (KR)

(73) Assignees: Electronics and Telecommunications Research Institute, Daejon; SK Telecom Co., Ltd., Seoul, both of (KR)

( * ) Notice: Subject to any disclaimer, the term of this patent is extended or adjusted under 35 U.S.C. 154(b) by 0 days.

(21) Appl. No.: 09/070,742

(22) Filed: May 1, 1998

(30) Foreign Application Priority Data

May 2, 1997 (KR) ............................................. 97-17040

(51) Int. Cl.$^7$ ............................................... H04B 7/216
(52) U.S. Cl. ...................... 370/342; 370/360; 370/441; 379/220; 379/246; 379/337
(58) Field of Search .................. 370/357, 360, 370/438, 439, 441; 379/220, 232, 246, 229, 337, 342

(56) References Cited

U.S. PATENT DOCUMENTS

| | | | |
|---|---|---|---|
| 4,831,649 A | * | 5/1989 | Mejane ........................ 379/111 |
| 4,905,222 A | * | 2/1990 | Seeger ........................ 370/220 |
| 5,590,176 A | | 12/1996 | Agarwal et al. |
| 6,044,143 A | * | 3/2000 | Su ............................... 379/225 |
| H1941 H | * | 2/2001 | Hoffpauir .................... 379/265 |

OTHER PUBLICATIONS

Robert Cesar Betini et al., "Flow Control and Routing Algorithms in WAPSN", Comupter communications vol. 18, No. 5, May 1995, 1995–Elsevier Science B.V., pp. 345–356.

* cited by examiner

Primary Examiner—Hassan Kizou
Assistant Examiner—Roberta Stevens
(74) Attorney, Agent, or Firm—Jacobson Holman, PLLC

(57) ABSTRACT

This present invention relates to a method for managing trunk status of a CDMA mobile communication exchange. A CDMA mobile communication exchange according to the present invention has the logical trunk and physical trunks relation to the trunk status, which respectively are managed in separate subsystems, and handles the physical trunks distributed and implemented in various subsystems as a single route through the use of the logical trunk structure in order to manage it in a single subsystem, such that the easy route management and route data collection are made possible. Further, the duplicate management are made for the trunk status through separate systems, which allows thus program for managing logical trunk status to collect trunk status from subsystem for managing physical trunk status and vice versa. Therefore, an effective management for the trunk status can be accomplished, and the route management and routing functions are further improved.

6 Claims, 7 Drawing Sheets

| ROUTE NUMBER |
|---|
| THE NUMBER OF TRUNK GROUPS |
| LOCATION OF ROUTE INFORMATION |
| REPRESENTATIVE TRUNK GROUP NUMBER |
| TRUNK SELECTION METHOD |

(b)

| GROUP NUMBER |
|---|
| LOCATION OF TRUNK |
| THE NUMBER OF TRUNKS |
| ROUTE NUMBER |
| PRECEDING TRUNK GROUP NUMBER |
| FOLLOWING TRUNK GROUP NUMBER |

(c)

| GROUP ELEMENT NUMBER |
|---|
| TRUNK NUMBER |
| PRECEDING GROUP ELEMENT NUMBER |
| FOLLOWING GROUP ELEMENT NUMBER |
| AVAILABILITY |

(d)

| TRUNK NUMBER |
|---|
| TRUNK NUMBER |
| FOLLOWING TRUNK NUMBER GROUP NUMBER |
| GROUP NUMBER |
| LOCATION OF ROUTE INFORMATION |

FIG. 7
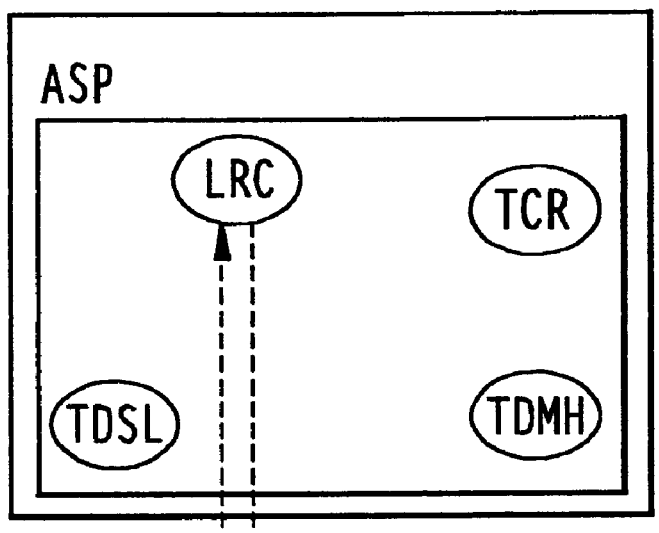
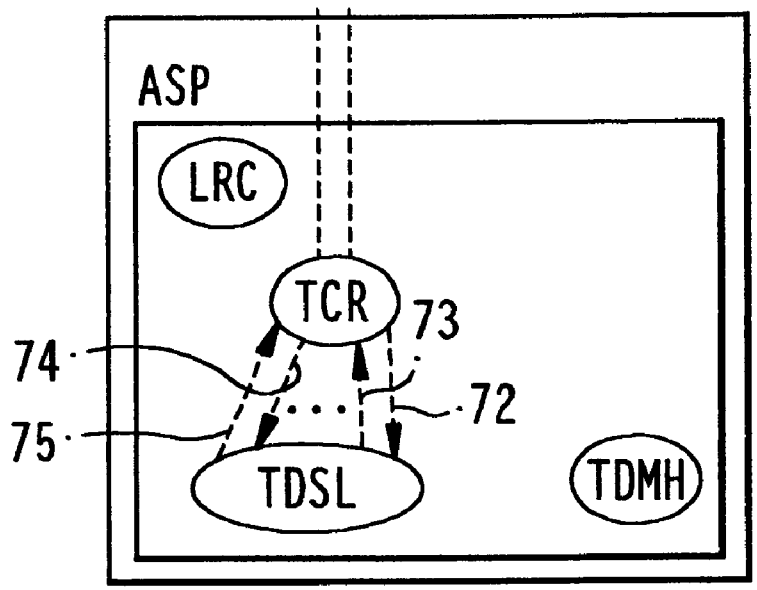

METHOD FOR MANAGING TRUNK STATUS OF A CDMA MOBILE COMMUNICATION EXCHANGE

BACKGROUND OF THE INVENTION

1. Field of the Invention

The present invention relates to a method for managing trunk status of a Code Division Multiple Access (CDMA) mobile communication exchange. More particularly, the invention relates to a method for managing trunk status of a CDMA mobile communication exchange by which an effective management for the trunk status, are made possible by the duplicate management for the trunk status through the use of the mobile communication exchange structure, the trunk being physically coupled for the purpose of communicating with exchanges, and by collecting the trunk status when abnormally-operated program which manages trunk status is recovered to a normal operation state thereof.

2. Description of the Conventional Art

The complicated exchanges of larger capacity are now made available in compliance with various service demands of a vast number of subscribers who intend to make telephone calls. These exchanges are connected to each other by way of trunks to efficiently use their respective resources. Further, each exchange manages various status of failure, busy, tests and idle for the connected trunks for an effective communications with other exchanges.

However, most exchanges, including TDX (Time Division eXchange), have limitations in the routing management, as well as in the collection of routine data information, because these systems manage trunks only through the subsystems having the trunks connected thereto (physical trunk status management), thus various route information consisting of trunks being separately distributed in various subsystems.

SUMMARY OF THE INVENTION

Therefore, it is an object to solve the above-mentioned problems by providing an efficient trunk status management for improving the routing management and routing functions.

To accomplish the above-mentioned objects, the invention is characterized in that a CDMA mobile communication exchange according to the present invention has the logical trunks and physical trunks in relation to the trunk status, which respectively are managed in separate another subsystems, and handles the physical trunks distributed and implemented in many subsystems as a single route through the use of the logical trunk structure in order to manage it in a single subsystem, such that the easy route management and route data collection is made possible.

The present invention is further characterized in that: the duplicate management are made for the trunk status through separate systems; and thereby although an abnormal operation of program adapted to perform the routing functions based upon the logical trunk status occurs, another separate system collects the trunk status from the subsystem for managing physical trunk status and then performs the suitable routing functions; in case the failed subsystem changes to its proper normal operation state, the subsystem collects the trunk status from the subsystem for managing physical trunk status to recover its inherent operation state, thereby performing the routing functions; and program for managing physical trunk status can collect trunk status from subsystem for managing logical trunk status.

BRIEF DESCRIPTION OF THE DRAWINGS

The present invention will become more fully understood to following detailed description taken in conjunction with the accompanying drawings, wherein:

FIGS. 2(a) through 2(d) show data structure for route and trunk associated with the CDMA mobile communication exchange;

FIG. 7 shows a block diagram for explaining the procedures for getting the trunk status identical with another trunk status through the trunk occupancy procedures in accordance with a fifth embodiment of the present invention.

DETAILED DESCRIPTION OF THE INVENTION

The preferred embodiments according to the present invention will now be described in detail in accordance with the accompanying drawings.

Figure 1:
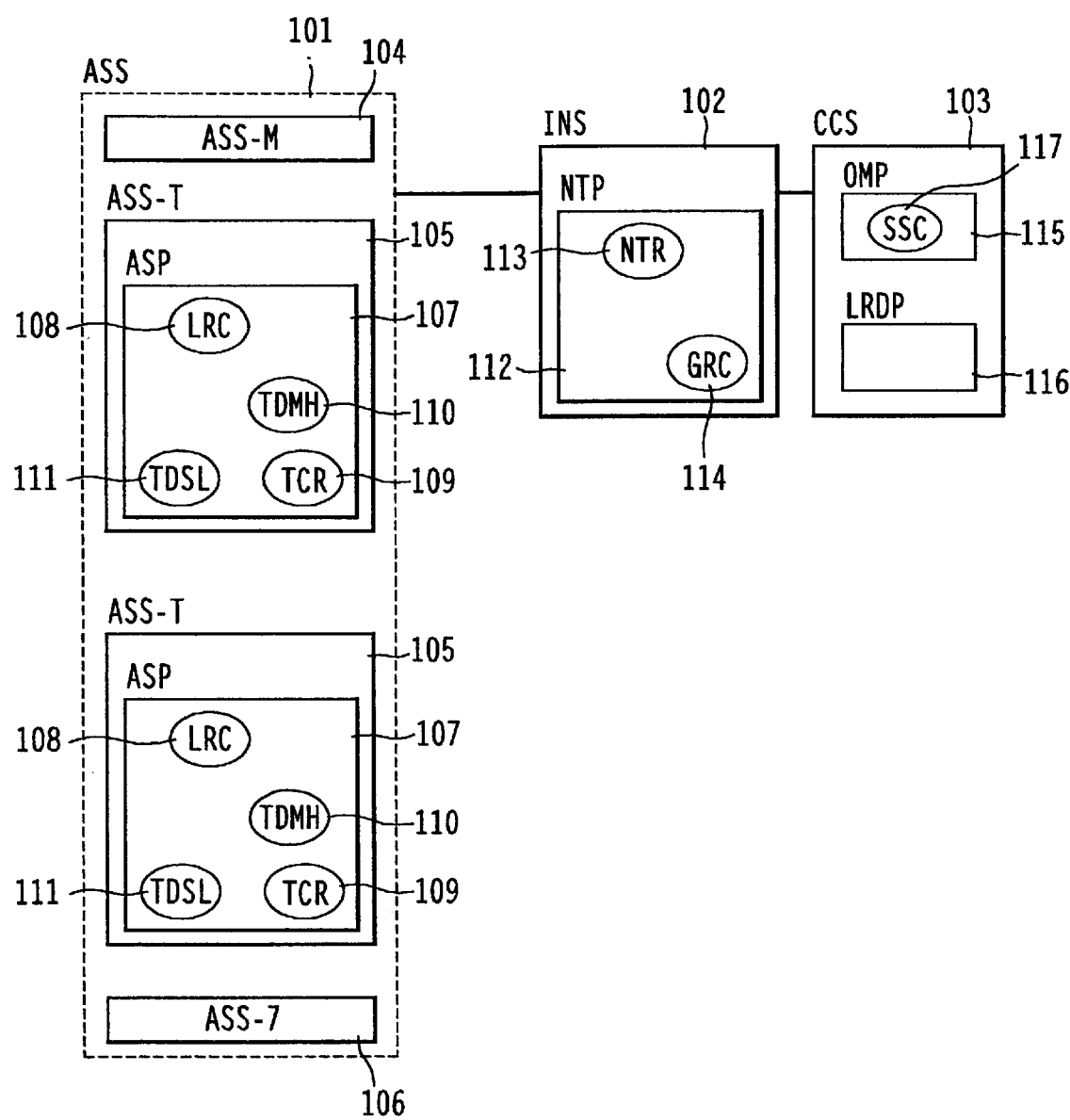
FIG. 1 shows an architecture for a CDMA mobile communication exchange in accordance with the present invention.

FIG. 1 is an architecture of a Code Division Multiple Access (CDMA) mobile communication systems to which the present invention is applied. The system includes Access Switching Subsystem (ASS) 101, Interconnection Network Subsystem (INS) 102, and Central Control Subsystem (CCS) 103.

The ASS 101 responsible for call handling functions includes subscribers and link access device, a time switch and various signaling devices. The ASS 101 is composed of an Access Switching Subsystem for mobile subscribers (ASS-M) 104, an Access Switching Subsystem for trunks (ASS-T) 105, and an Access Switching Subsystem for SS No. 7 signalling (ASS-7) 106 for a common-line signal. And up to 63 SS No. 7 signaling links can be supported depending upon the number of subscribers and link capacity.

The INS 102 functions as switch for connecting between subsystems constituting the ASS 101, and includes Number Translation Processor (NTP) 112. The NTP 112 is composed of a Number Translation Registration (NTR) block 113 for performing the functioning of Number translation and a Global Routing Control (GRC) block 114 responsible for the routing functions.

The CCS 103 composed of Operation and Maintenance Processor (OMP) 115 and Location Register Data Processor (LRDP) 116 manages and maintains the systems, bills, obtains statistics, controls input/output devices, registers mobile subscriber locations and manages the information on subscribers. Further, the OMP 115 includes System Status Control block (SSC) 117 for checking hardware failure status of mobile communication exchange.

As the blocks associated with trunk status in an Access Switching Processor (ASP) 107, there are provided: a Local Routing Control (LRC) block 108 for selecting available trunks from determined routes and for requesting an occupancy of the selected trunks, as well as for managing logical trunk status; a trunk control block for R2 signaling (TCR) 109 which tries to occupy trunk; a telephony device maintenance handling block (TDMH) 110 which manages the failed status of trunk coupled to the ASS-T 105; and a telephony device system library (TDSL) 111 which stores and manages physical truck status when the failed or busy trunk status is notified. Also, the NTP 112 in the INS 102 further includes: an NTR block 113 which is operated to translate an incoming subscriber number and to then determine the proper routine; and a GRC block 114 which collects, in case the routing function cannot be made due to an abnormal operation of the LRC block 108 in the ASP 107, the route information managed by said ASP 107 and performs the required routing function.

For the mobile communication exchange, management for the trunk status is made by the TDSL 111. The TDSL 111 is notified that the trunk is failed or under test mode from the TDMH block 110 in the subsystem functionally made identical with the LRC block 108 for managing a logical trunk status to select an available trunk from the determined route, and is notified an occupancy and release of the trunk from the TCR block 109 to store and manage the physical trunk status. The change of trunk status in the mobile communication exchange occurs when the trunk is occupied or released to voice-communicate with the other station, when an operator demands such change, or when the system or trunk is failed.

FIGS. 2(a) to 2(d) show data structure for managing the logical trunk status for the routing. One route consists of a number of trunk groups (1 route:n groups), each of which consists of a number of group elements (1 group:n elements) to which are, respectively, assigned each different trunk number (1 element:1 number). The trunks coupled to respective ASS-Ts are divided into the trunk groups. The trunk groups obtained from some of the ASS-Ts are integrated to form a single route. The resultant single route can be distributed in the subsystems. Further, the information on the route can be distributed in the ASP of each ASS-T, thereby to allow the routing functions depending upon to the route.

FIG. 2(a) represents a structure on the route information, the structure including route number for each route, representative trunk group number constituting the route, a processor (ASP) number which manages the number of groups and route information, and any other information on the route. Such information is accommodated in all ASS-T and NTP, and may be also changed by the operator.

FIG. 2(b) represents a structure on the trunk group information, which includes each group number, the preceding trunk group number and following trunk group number used for connecting the groups, the number of trunk assigned to the group, and trunk locations. Such information is distributed all ASS-T and NTP and is changed by an operator.

FIG. 2(c) represents a structure on the group element information, which are stored in the processor managing the rout information. As shown in FIG. 2(d), the structure is composed of trunk number assigned for group elements, the preceding group element number and following group element number for connecting to link, and flag indicating if it is available. This information is accommodated and managed in the LRC of ASS-T which is to manage the logical trunk status so as to select the trunk which can be used for the routing.

Further, the status of such information may be changed in compliance with the operator's demands and changes of the trunk status during using the system.

FIG. 2(d) represents a structure on the trunk information, which is stored in the processor to which the physical trunk is connected. As shown in FIG. 2(d), the trunk information includes the trunk number assigned element number, the following trunk number, group number, and route managing location processor number, etc. This information is accommodated and managed in the TDSL of ASS-T for managing the physical trunk status when required by the TDMH block.

Figure 3:
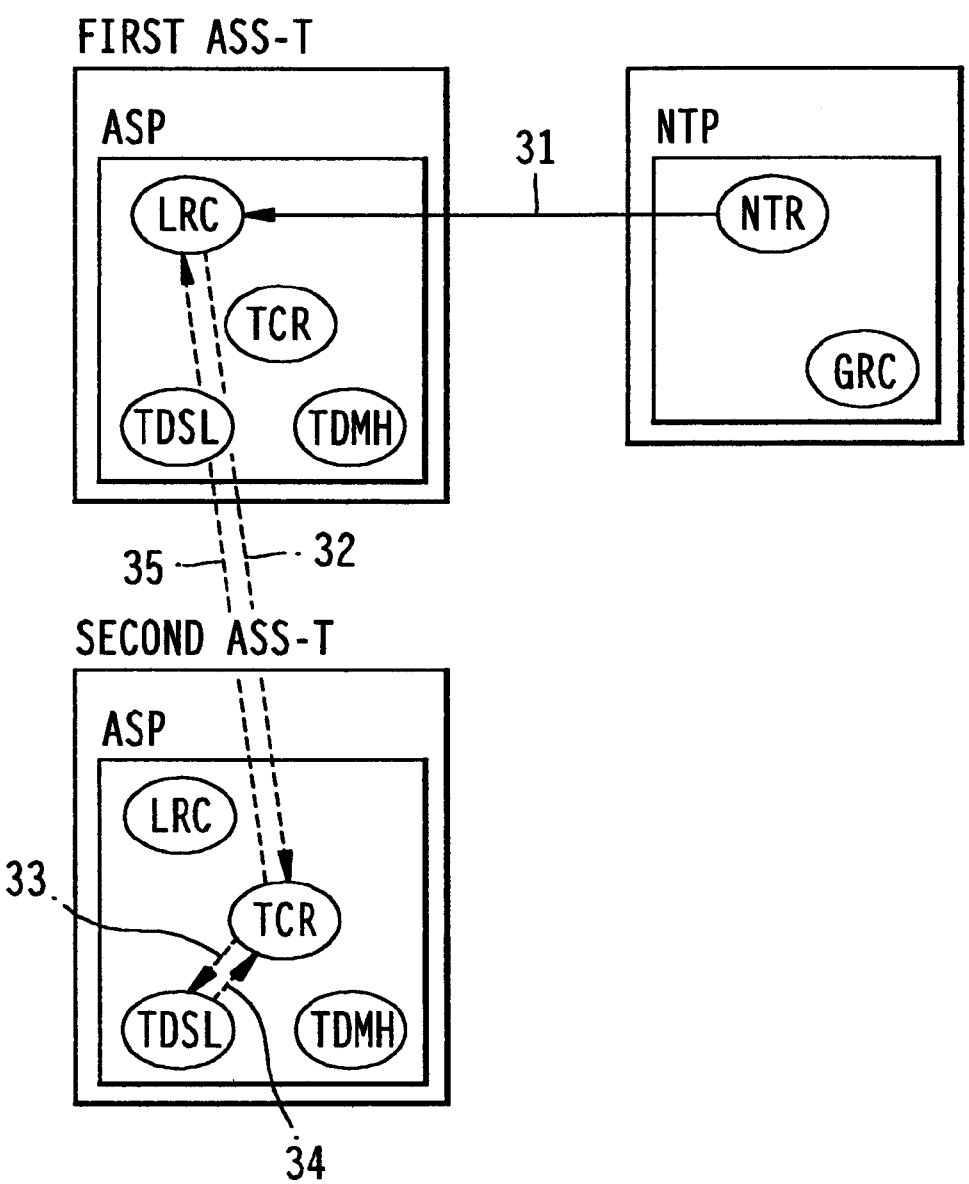
FIG. 3 shows a block diagram for explaining the procedures for changing the trunk status by the trunk occupancy and notification in accordance with a first embodiment of the present invention.

The blocks illustrated in FIG. 3 are to explain the trunk status changing procedures in response to the trunk occupancy requests and notification therefor in accordance with a first embodiment of the present invention. This drawing shows the procedures that an available trunk is selected by the LRC block located in the ASP of the first ASS-T which is requested for the routing from the NTR block of NTP and the LRC registers the busy status of the selected trunk. The NTR block of NTP selects the first ASS-T with reference to the route number, and requests the LRC block of the ASP included therein to conduct the routing (31). The LRC block requested for the routing locates an idle element number (or logical trunk number) among the trunk groups through the use of the representative group number determined from FIG. 2(a), the trunk selecting scheme, and the trunk group information and group element information illustrated in FIGS. 2(b) and 2(c). Then, the LRC block registers the busy status of the located one. Thereafter, the second ASS-T is selected in which the physical trunk number assigned to said element number and trunk are provided, and then the trunk occupancy to the TCR block of ASP is requested (32). The TCR block requested for the trunk occupancy request the TDSL of ATP in the second ASS-T located itself that the trunk busy registration is made (33). In case the trunk status requested is idle, the TDSL performs the busy status registration to the trunk in question and then notifies the TCR block of completion of the idle status registration (34). The TCR block notified notifies the occupancy success to the LRC block located in ASP of the first ASS-T (35). At this time, the LRC block changes the logical trunk number when the trunk number requested for the occupancy therefor is different from the trunk number successfully occupied, through the comparison between the trunk numbers.

Figure 4:
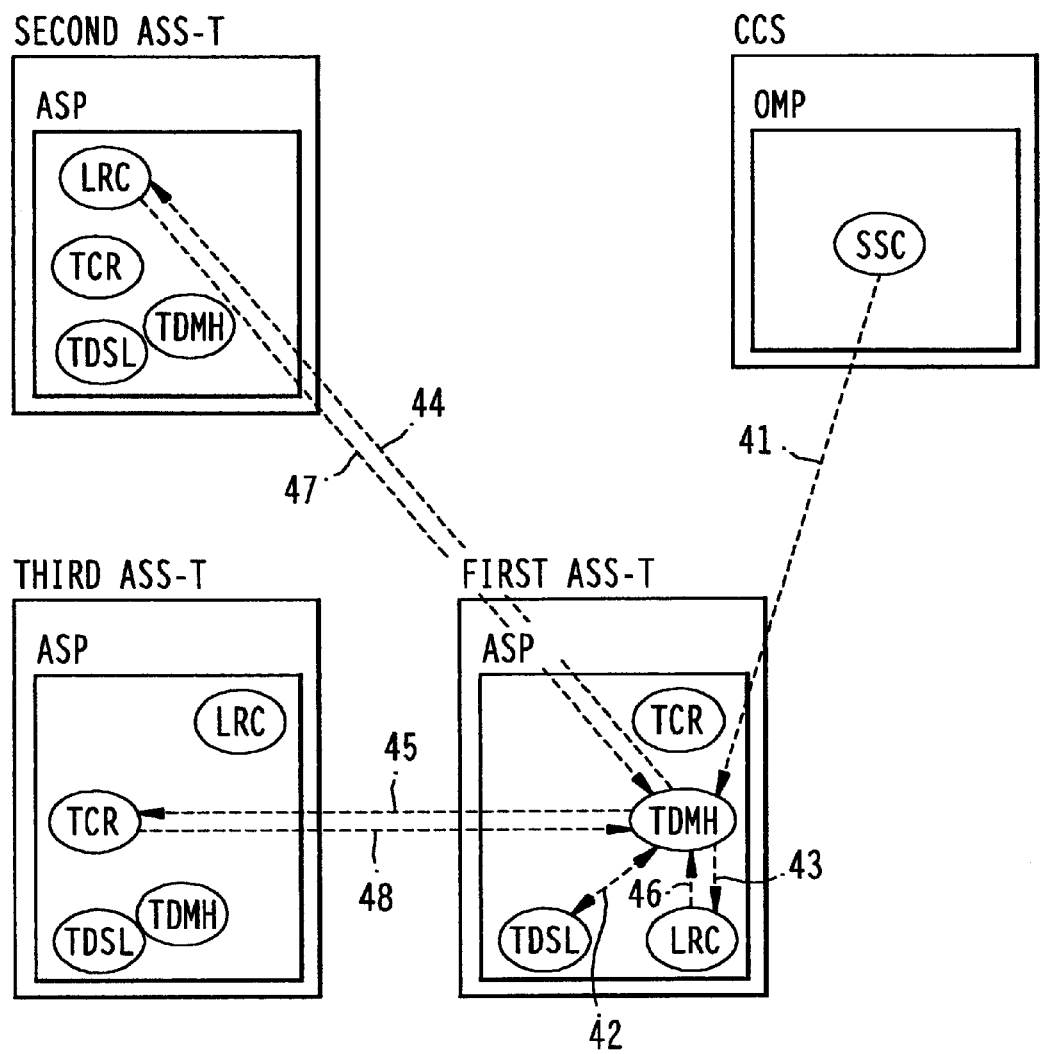
FIG. 4 shows a block diagram for explaining the procedures for changing the trunk status whose failed status is detected in accordance with a second embodiment of the present invention.

FIG. 4 represents a block diagram, explaining the procedures for changing the status of the trunks whose failure status is detected in accordance with a second embodiment of the present invention. The SSC block located in the OMP of the CCS serves to detect whether or not hardware failure of the mobile communication exchange occurs and to notify the detected failure status to the TDMH block located in the ASP of the first ASS-T which manages the physical trunk number for the trunks of interest (41). Then, the TDSL for managing the physical trunk status for the trunks is requested to change the status of the trunks from the TDMH block which receives the failure status (42). Thereafter, the subsystem managing the logical trunk information from the physical trunk number and the logical trunk number are located, and then the changes of the trunk status are requested to the associated ASS-Ts (the first, second and third ASS-Ts) (43, 44, 45). Each LRC block requested performs the changes of the associated trunk status and of the associated route information, and completion of the status changes is notified to the TDMH block which had made such requests (46, 47, 48).

Figure 5:
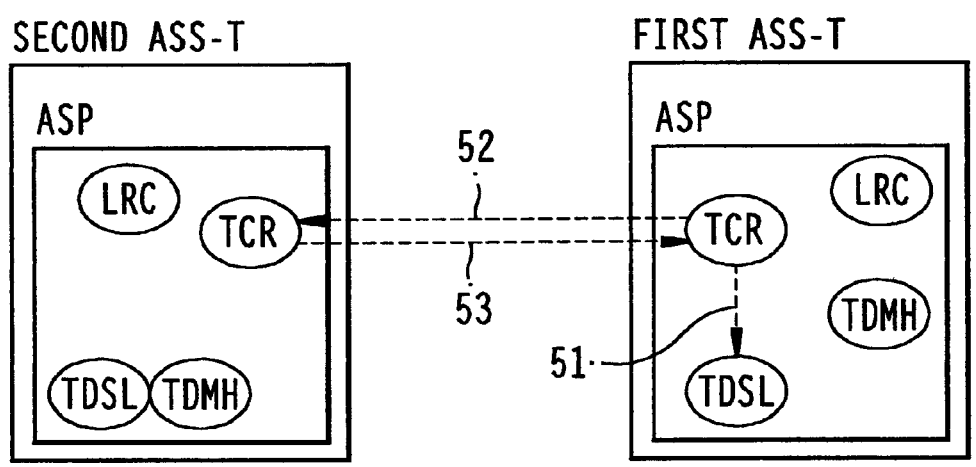
FIG. 5 shows a block diagram for explaining the procedures for changing the trunk status after completing the use of the busy trunk in accordance with a third embodiment of the present invention.

FIG. 5 represents a block diagram for explaining the procedures for changing the status of the trunks after using the busy trunk in accordance with a third embodiment of the present invention. The TCR block, which is responsible for the control of the links and located in the ASP of the first ASS-T, detects an end of the calling and then requests to the TDSL managing the physical trunk status the change of the trunk status into the idle status thereof (51). Thereafter, the ASS-T managing the logical trunk information from the physical trunk number and the logical trunk number are located, and then the changes of the trunk status are requested to the associated second ASS-T (52). The LRC block requested performs the change of the associated trunk status, and notifies the TDMH block made such requests of the completion of the status changes (53).

Figure 6:
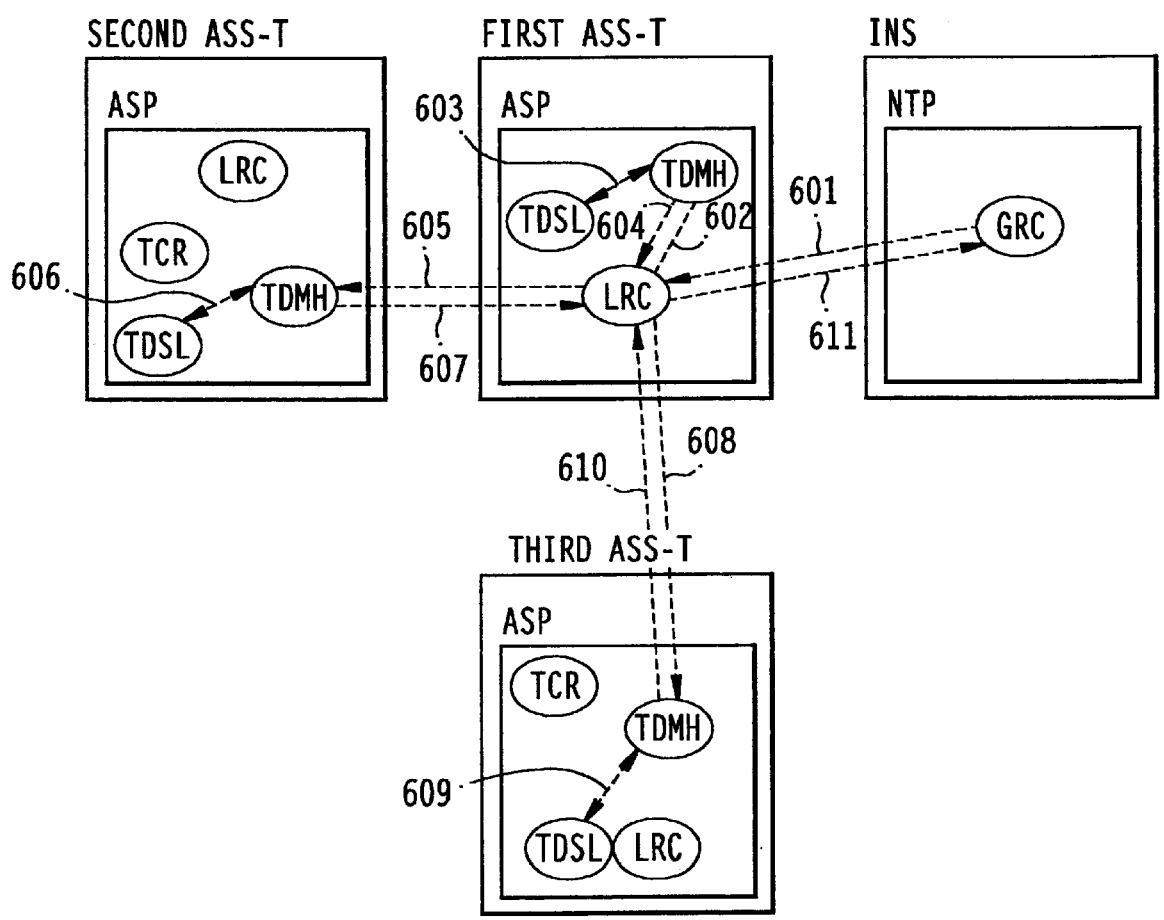
FIG. 6 shows a block diagram for explaining the procedures for changing the trunk status when the requests of an operator are made in accordance. with a fourth embodiment of the present invention.

FIG. 6 represents a block diagram for explaining the procedures for changing the status of the trunks according to the operator's requests in accordance with a fourth embodiment of the present invention, which shows the procedures for changing the status of the trunks for specific route as requested by the operator. Upon receipt of the request for the status change from the operator, the GRC block located in the NTP of the INS locates the first ASS-T managing the associated route, and requests the LRC block in said first ASS-T to change the status of the route (601). At this time, the LRC block changes, according to the operator's request, the logical trunk number of the relevant trunk constituting the route of interest. The ASS-T is then located which has the physical trunk number assigned to the associated trunk and the physical trunk. Subsequently, the status change for the trunk is requested to respective TDMH blocks in the first, second and third ASS-Ts (602, 605, 608). The respective TDMH blocks request respective TDSLs to change the status of the trunk, which in turn each TDSL performs the status change for the trunk. The result is notified to the TDMH block (603, 606, 609). Then, the TDMH block notifies the LRC block of the trunk status-changed result (604, 607, 610), followed by subsequent notification of LRC block to the GRC block (611). The operator who requested the status change for the trunk of the route is notified by the GRC block.

FIG. 7 represents a block diagram for explaining the procedures for getting the logical trunk status identical with the physical trunk status on the basis of the trunk occupancy message in accordance with a fifth embodiment of the present invention. For this end, the LRC block in the first ASS-T selects an idle, or available trunk with reference to the logical trunk number of the specified route, and requests the TCR block in the ASS-T (the second ASS-T) to occupy the trunk (71), wherein the second ASS-T manages the physical status for the selected trunk. At this time, the TCR block requests to TDSL in the second ASS-T the registration of the busy status (72). In case non-idle status of the trunk number requested is known, or if in the busy status, or in the blocking status, the notification that it is impossible to use is delivered to the TCR block (73). Therefore, the TCR block continues to communicate with the TDSL so as to find an idle trunk (74). When an idle trunk is found, the busy status is registered to the associated trunk number, and then completion of such registration is notified to the TCR block (75). The TCR block notifies the LRC block in the first ASS-T of an occupancy success message which contains the trunk number for which the occupancy is requested from the LRC block in the first ASS-T and another new trunk number obtained in relation to an occupancy success (76). Based upon the notified information on the trunk status, the LRC block changes the information on the logical trunk status to get the logical trunk status, which the LRC block in the first ASS-T manages, identical with the physical trunk status which the TDSL in the second ASS-T manages.

According to the foregoing, the present invention relating to the CDMA mobile communication exchange has the logical trunk and physical trunks in relation to the trunk status, which respectively are managed in separate subsystems, and handles the physical trunks distributed and implemented in various subsystems as a single route through the use of the logical trunk structure in order to manage it in a single subsystem, such that the easy route management and route data collection is made possible. In case the subsystem managing the route enters into an abnormal operation state and thereby cannot perform its proper functions of the routing, other subsystems collects the logical trunk status for performing the routing instead, which improves the routing functions of the mobile communication exchange and further an efficiency of the exchange accordingly.

While the present invention has been described with respect to certain preferred embodiment only, other modifications and variations may be made without departing from the scope of the present invention as set forth in the following claims.

What is claimed is:

1. A method for managing trunk status of a CDMA mobile communication exchange, the method comprising steps of:
   a number translation block in a number translation processor requesting a local routing control block of a first trunk access switching subsystem, the control block being selected based upon route number for managing determined route information, to conduct routing;
   said requested local routing control block locating available logical trunk number from trunk groups constituting routes and then registering the busy status therefor;
   said local routing control block selecting a second trunk access switching subsystem in which physical trunk number assigned to said logical trunk number and trunk number are provided;
   said local routing control block requesting an R2 signaling trunk control block in the selected second trunk access switching subsystem to occupy the trunk;
   the requested R2 signaling trunk control block requesting a telephony device system library in the second trunk switching subsystem to which said R2 signaling trunk control block pertains, to register the busy status of the trunk;
   if the requested trunk status is in idle status, conducting the registration of the busy status for the associated trunk and then notifying the R2 signaling trunk control block of completion of the busy status registration;
   said R2 signaling trunk control block notifying the local routing control block in the first trunk access switching subsystem of occupancy success; and
   said notified routing control block confirming whether the trunk number requested to be occupied is identical with the successful trunk number or not.

2. The method of claim 1, wherein said usable logical trunk number among trunk groups constituting said routes is found based upon a scheme for selecting trunk associated with determined route from the route information data, representative group number, trunk group information and group element information.

3. A method for managing trunk status of a CDMA mobile communication exchange, the method comprising the steps of:

after a system status control block of a central control subsystem senses failure status of specific trunks, the result being notified to a telephony device maintenance handling block in a first trunk access switching subsystem;

said notified telephony device maintenance handling block requesting said telephony device maintenance handling block in a first trunk access switching subsystem to change the status of the associated trunks;

said telephony device maintenance handling block locating a subsystem for managing logical trunk information and a logical trunk number from the physical trunk numbers, and then requesting local routing control block in associated trunk access switching subsystems to change the trunk status; and after said respective local routing control blocks change the associated trunk status, completion of the status change being notified to the telephony device maintenance handling block in the first trunk access switching subsystem having requested the status change.

4. A method for managing trunk status of a CDMA mobile communication exchange, the method comprising the steps of:

an R2 signalling trunk control block requesting a telephony device system library of a first trunk access switching subsystem, the subsystem having sensed an ending of call, to change the trunk status into an idle status;

said R2 signalling trunk control block locating a second trunk access switching for managing logical trunk information and logical trunk number and then requesting local routing control block of the second trunk access switching subsystem to change the trunk status; and after said local routing control block changes the trunk status, notifying the R2 signalling trunk control block of said first trunk access switching subsystem having requested the status change of completion of the status change.

5. A method for managing trunk status of a CDMA mobile communication exchange, the method comprising the steps of:

when a global routing control block of an interconnection network subsystem is requested to change status for specific route by an operator, locating a first trunk access switching subsystem for managing said route;

requesting a local routing control block in the first trunk assess switching subsystem to change the route status;

said local routing control block changing a logical trunk number constituting said route according to the requests of the operator;

said local routing control block requesting a telephony device maintenance block of the trunk access switching subsystem, the block being provided with a physical trunk number assigned to the associated trunk and the physical trunk, to change the trunk status;

said telephony device maintenance block requesting a telephony device system library to which said block pertains to change the trunk status;

said telephony device system library changing the trunk status according to the requests of a user and then notifying the resultant to the telephony device maintenance handling block;

said telephony device maintenance handling block notifying the local routing control block of said first trunk access exchange subsystem of the trunk status-changed result;

the notified local routing control block notifying the global routing control block of the interconnect subsystem of the change result; and the notified global routing control block notifying the operator of said result.

6. A method for managing trunk status of a CDMA mobile communication exchange, the method comprising the steps of:

a local routing control block of a first trunk access exchange subsystem selecting available trunk from logical trunk number associated with determined route, and requesting an R2 signaling trunk control block of a second trunk access exchange subsystem for managing physical status on said selected trunk to occupy the trunk;

said requested R2 signaling trunk control block requesting a telephony device system library of the second trunk access switching subsystem to which said R2 signaling trunk control block pertains, to conduct a registration of a busy status;

if the trunk number requested to be used is not idle, said telephony device system library notifying R2 signalling trunk control block of unusable status;

the notified R2 signaling trunk control block continuing to communicate with the telephony device system library so as to find out an available trunk;

if the telephony device system library locates a usable trunk through the continued communication with the R2 signaling trunk control block, the system library registering the busy status in the trunk number, and then notifying the R2 signaling trunk control block of completion of the registration;

the notified R2 signaling trunk control block notifying the local control block of the first trunk access switching subsystem of an occupancy success message containing the trunk number requested to be occupied and another new trunk number made successful for a requested occupancy; and the local routing control block getting the trunk status of the telephony device system library in the first trunk access switching subsystem identical with that of the telephony device maintenance handling block through the change of the logical trunk status based upon the trunk status information.

* * * * *